US012576548B2

(12) United States Patent
Haapanen et al.

(10) Patent No.: US 12,576,548 B2
(45) Date of Patent: Mar. 17, 2026

(54) SLITTER-WINDER AND FIBER WEB PRODUCTION LINE CONTROL SYSTEM

(71) Applicant: Valmet Technologies Oy, Espoo (FI)

(72) Inventors: Jaakko Haapanen, Järvenpää (FI); Marko Jorkama, Järvenpää (FI); Jari Kääriäinen, Jyväskylä (FI); Marko Kääriäinen, Järvenpää (FI); Kenneth Åkerlund, Järvenpää (FI)

(73) Assignee: Valmet Technologies Oy, Espoo (FI)

( * ) Notice: Subject to any disclaimer, the term of this patent is extended or adjusted under 35 U.S.C. 154(b) by 269 days.

(21) Appl. No.: 18/131,991

(22) Filed: Apr. 7, 2023

(65) Prior Publication Data

US 2023/0321858 A1 Oct. 12, 2023

(30) Foreign Application Priority Data

Apr. 11, 2022 (FI) ..................................... 20225318

(51) Int. Cl.
*B26D 1/14* (2006.01)
*B26D 5/32* (2006.01)
(Continued)

(52) U.S. Cl.
CPC ............... *B26D 5/32* (2013.01); *B26D 1/141* (2013.01); *B65H 35/008* (2013.01); *B65H 43/00* (2013.01); *B65H 2301/4148* (2013.01)

(58) Field of Classification Search
CPC .................. B65H 35/008; B65H 43/00; B65H 2301/4148; B65H 2557/10;
(Continued)

(56) References Cited

U.S. PATENT DOCUMENTS 6,629,659 B1 * 10/2003 Innala .................... B65H 18/26 242/413.5
7,100,657 B2 * 9/2006 Kataoka ............... B65H 18/106 156/565
(Continued)

FOREIGN PATENT DOCUMENTS

CN 115072032 B * 5/2024 ............. B65B 15/04
CN 117509278 B * 9/2024 ............. B65H 18/08
(Continued)

OTHER PUBLICATIONS

European Search Report for EP23162779 dated Aug. 29, 2023.
Search Report, Finnish Patent and Registration Office for FI 20225318, dated Oct. 18, 2022.

*Primary Examiner* — Jose A Fortuna
(74) *Attorney, Agent, or Firm* — Stiennon & Stiennon

(57) ABSTRACT

A system (50) for controlling performance of a slitter-winder (25) and/or a fiber web production line (100) has an advisor unit (34, 36, 37) with a processor and a memory including computer program code, configured to cause the advisor unit (34, 36,37) to generate and transmit signals as first control data to the slitter-winder (25) and/or as second control data to the fiber web production line (100) based on information data received from the slitter-winder (25) and the fiber web production line (100) to control performance of the slitter-winder (25) and/or the fiber web production line (100). Performance of a slitter-winder (25) and/or a fiber web production line is controlled by receiving information data from the slitter-winder and the fiber web production line (100), processing the received information data according to a predetermined configuration, based on the processed data; generating signals according to the predetermined configuration to control the performance.

16 Claims, 2 Drawing Sheets

(51) Int. Cl.
*B65H 35/00* (2006.01)
*B65H 43/00* (2006.01)

(58) Field of Classification Search
CPC ............ B65H 2557/20; B65H 2557/25; B65H 2557/60; B65H 23/195; B65H 35/02; B65H 26/02; B65H 26/08; B65H 18/00; B65H 23/26; B65H 26/04; B65H 2701/10; B26D 5/32; B26D 1/141; B26D 5/00; D21G 9/0009
See application file for complete search history.

(56) References Cited

U.S. PATENT DOCUMENTS

| | | | | |
|---|---|---|---|---|
| 11,008,190 | B2 * | 5/2021 | Pitkänen | B65H 26/04 |
| 12,066,816 | B2 * | 8/2024 | Celli | B65H 18/08 |
| 2006/0076119 | A1 | 4/2006 | Muench et al. | |
| 2006/0185809 | A1 * | 8/2006 | Elfrink | D21G 9/0009 162/198 |
| 2010/0106301 | A1 * | 4/2010 | Leppa | B65H 18/08 700/275 |
| 2019/0055102 | A1 * | 2/2019 | Pitkänen | B65H 26/04 |
| 2021/0379783 | A1 * | 12/2021 | Floeder | B26D 5/34 |
| 2021/0394386 | A1 * | 12/2021 | Acciari | B26D 7/2635 |
| 2023/0321858 | A1 * | 10/2023 | Haapanen | B65H 35/008 242/522 |
| 2024/0217767 | A1 * | 7/2024 | Haapanen | B65H 19/20 |

FOREIGN PATENT DOCUMENTS

| | | | | | |
|---|---|---|---|---|---|
| DE | 112005000796 | T5 | * | 3/2007 | D21G 9/0045 |
| DE | 202009015373 | U1 | | 2/2010 | |
| EP | 1956456 | B1 | * | 7/2010 | D21G 9/0009 |
| EP | 1839022 | B1 | * | 6/2016 | B65H 23/0204 |
| EP | 3825267 | A1 | | 5/2021 | |
| EP | 4261165 | A1 | * | 10/2023 | B65H 26/02 |
| FI | 110425 | B | * | 1/2003 | G05B 23/0245 |
| FI | 131381 | B1 | * | 3/2025 | B65H 43/00 |
| JP | S5874443 | A | | 5/1983 | |
| JP | 4388227 | B2 | * | 12/2009 | B65H 23/195 |
| JP | 2021535291 | A | * | 12/2021 | B65H 23/1955 |
| WO | WO-2006134213 | A2 | * | 12/2006 | D21G 9/0009 |
| WO | 2008096034 | A1 | | 8/2008 | |
| WO | WO-2020079568 | A1 | * | 2/2020 | B26D 5/34 |
| WO | WO-2021073846 | A1 | * | 4/2021 | D21F 9/00 |

* cited by examiner

SLITTER-WINDER AND FIBER WEB PRODUCTION LINE CONTROL SYSTEM

CROSS REFERENCES TO RELATED APPLICATIONS

This application claims priority on FI 20225318, filed Apr. 11, 2022, the disclosure of which is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

In general, the present invention relates to production of fiber webs, in particular to producing board webs. More especially the present invention relates to a system or method of controlling performance of a slitter-winder and/or the fiber web production line that receives and process data related thereto.

As known from the prior art in fiber web producing processes typically comprises an assembly formed by a number of apparatuses arranged consecutively in the process line. A typical fiber web production line comprises a head box, a wire section and a press section as well as a subsequent drying section and a reel-up. The fiber web production line can further comprise other sections and devices for finishing the fiber web, for example a sizer, a coating section and a calender, located before the reel-up. Typically the reel-up is followed by at least one slitter-winder on- or off-line for forming customer rolls and the slitter-winder is followed by a roll packaging apparatus for packing the customer rolls. The fiber web production line may also comprise an off-line coating section with an unreeler, a coater and a re-reeler.

Before the head box pulp and/or recycled fiber are treated in the fiber web production line in a pulp treatment section to be fed into the head box to be used to produce the fiber web. As known the pulp treatment system typically comprises a pulping section followed by coarse screening section, after which the centrifugal cleaning section is located. The centrifugal cleaning is followed by fractionation section, at which short fiber content is typically 50-70% and long fiber content is typically 30-50% for container board stock. Short fiber stock is lead to short fiber deashing washers and long fiber stock is lead to long fiber fine screening system and after the long fiber fine screening system to long fiber thickening system, from which filtrates are led to filtrate tanks and long fiber stock to long fiber tank. From the short fiber deashing washers, short fiber stock is led to a short fiber tank and filtrate waters to white water tank via a short fiber deashing micro-flotation system. From the short fiber tank, the short fiber stock is led to a short fiber refining system and from the long fiber tank the long fiber stock is led to a long fiber system. In treatment of the pulp and the recycled fibers, after the cleaned stock is thickened for increasing strength of the fiber web to be produced. In the prior art systems basically all the pulp and recycled fiber stock to be led to the head box is treated and washed such that ash content is reduced to acceptable level in the various deashing systems.

And as known, fiber webs, such as paper or board webs, are manufactured in machines together forming a fiber web manufacturing line, which may be hundreds of meters long. Fiber webs, especially paper and board are available in a wide variety of types and can be divided according to basis weight in two grades: papers with a single ply and a basis weight of 25-300 g/m$^2$ and boards manufactured in one- or multi-ply technology and having a basis weight of 150-600 g/m$^2$. It should be noted that the borderline between paper and board is flexible since board grades with lightest basis weights are lighter than the heaviest paper grades. Generally speaking, paper is used for printing and board for packaging.

In fiber web production lines, manufacturing operates as a continuous process and the process is generally run with constant speed and with constant basis weight, when producing selected fiber web grade. The finished fiber web being output from the machine is wound with a reel-up around a reeling shaft, i.e. a reel spool, into a parent roll (a machine roll), the diameter of which may be more than 5 meters, and which may weigh more than 160 tons. The purpose of the reeling is to transfer the fiber web from its planar manufacturing form into a form in which it can be handled more easily. The reel-up is thus a device that reels a material, which is produced as a continuous fiber web in a fiber web production line, into form of a roll; the parent roll. In the production process of the fiber web, the reeling is generally a first process part, wherein a continuous process is discontinued to be continued in sequences. The parent roll is formed around the reeling shaft that functions as a core of reeling, i.e. the fiber web on one parent roll around one reeling shaft has a beginning and an end.

The web of the parent roll generated during manufacture is full-width and even more than 100 km long, so it must be cut into partial webs of a suitable width and length for customers and wound around cores into “customer rolls” before dispatch from the mill. As known, this slitting and winding of the web takes place in a separate machine fitted to the purpose, i.e., a slitter-winder. In the slitter-winder the parent roll is unwound in the unwinding station off the reeling shaft and the broad web is slit with the slitting section into a number of narrower partial webs, which are wound with the winding section in the winder around winding spools such as cores into customer rolls. When the customer rolls are ready, the slitter-winder is stopped and the rolls, or “set”, is removed from the machine. After this, the process continues with the winding of a new set. These stages are repeated periodically until the fiber web on the parent roll runs out from the reeling shaft, at which point the parent roll is replaced and the operation restarts with the unwinding of a new parent roll from the reeling shaft. The slitting and winding process is a cyclic process, wherein the process is in the beginning accelerated to a set running speed and when a set of customer rolls is about to be finished the process is decelerated. The finished set of the customer rolls is removed from the winder of the slitter-winder and new cores for winding the next set of the customer rolls are fed to the winder. Typically, from one parent roll 3-12 sets of the customer rolls are slitted and wound and there after a new parent roll is changed to the unwinder, typically at the same time with the removal of the last set of the customer rolls. Thus, capacity of a slitter-winder is dependent on sequence times of the slitter-winder and on the running speed of the slitter-winder. The running speed of the slitter-winder, in turn, is dependent on properties of the fiber web on the parent roll in the unwinder. Increasing the running speed may result vibration problems. This vibration causes winding reject, mechanical wear of the parts and element of the slitter-winder, even loosening of the customer rolls from the winder as well as decrease of winding capacity as the running speed has to be lowered. The vibration phenomenon thus, often limits the maximum speed utilizable in the winding and therefore decreases capacity of the slitter-winder. In the worst case, the vibration phenomenon can cause the out-throwing of the set of the customer rolls from the winder. Additionally, web breaks may occur due to the vibration phenomenon. The web breaks may also be caused by weakness of the fiber web of by defects in the fiber web.

The winder of the slitter-winder winds the web layers on top of each other. The cross profiles generally on fiber web production lines by the nature of the process is fairly stable. This will consequently lead to that the wound layers will cumulate the profile variations, especially caliper profile but also tension profile and other profiles. A slitter-winder process with a two drum solution and a rider roll evens out the cumulated profile variations as the rider roll will cause higher loading on thicker areas and hence the winding phenomenon will consequently reduce the diameter in those areas.

However, the slitter-winder can only even out the set roll diameters to a certain extent, it cannot cover very large variations and thus, the set will consist of different roll diameters.

When the rider roll due to set the roll cross profile loses contact to all of the rolls, it will affect the dynamical behaviour of the rider roll and hence lead to rider roll vibrations causing risk for roll throw outs or web breaks, or even break down of equipment. Hence the winding speed is typically reduced causing also then capacity loss in the slitter-winder process.

A typical running speed of the slitter-winders is around 2500 m/min, in case a web breaks occurs, naturally the operation of the slitter-winder is interrupted. During a web break parts and pieces of the fiber web are flow around, and thus before beginning the operation again, the slitter-winder and its surroundings must be cleaned. This takes typically about 20 minutes but may take even 1 hour. The capacity loss being typically about 5%.

In case the off-throwing of the set of the customer rolls occurs, it may cause significant damages also to the parts and elements of the slitter-winder. Thus, significant repair work may be needed before the operation of the slitter-winder can be restarted. The repair work may easily take 12 hours, in worst cases a day or more. The capacity loss being typically about 50%.

The decrease of the running speed of the slitter in order to avoid the vibration phenomenon is typically executed in one or more stages. This affects the capacity roughly as comparable to decrease of the running speed by about 300 m/min but is of course more significant the higher running speeds are desired. The capacity loss being typically about 7%.

The above problems are enhanced in the present days, as further increased running speeds of the slitter-winders are desired and the above problems cause the more capacity loss the higher the running speed of the slitter-winder is.

The running speeds of modern paper web production lines are in present times so high, that typically two slitter-winders are needed for one production line as capacity of one slitter-winder would not be enough to fulfil the need of slitting-winding of the fiber web produced by the paper web production line. Thus, there exist a need to increase the capacity of a slitter-winder such, that just one slitter-winder would fulfil the capacity need to the paper web production line, which means significant savings in investment and operating costs of a paper web production line.

An object of the invention is to create a system of controlling performance of a slitter-winder and/or the fiber web production line, in which the disadvantages and problems of prior art are eliminated or at least minimized.

A further object of the invention is to create a method of controlling performance of a slitter-winder and/or a fiber web production line, in which the disadvantages and problems of prior art are eliminated or at least minimized.

A particular object of the invention is to create a system of controlling performance of a slitter-winder and/or the fiber web production line, in which the disadvantages and problems of prior art relating to losses of capacity of the slitter-winder are eliminated or at least minimized.

Another particular object of the invention is to create a method of controlling performance of a slitter-winder and/or a fiber web production line, in which the disadvantages and problems of prior art relating to losses of capacity of the slitter-winder are eliminated or at least minimized.

SUMMARY OF THE INVENTION

In order to achieve the above-mentioned objects, the system of controlling performance of the slitter-winder and/or the fiber web production line according to the invention is mainly characterized by a system or method of controlling performance of a slitter-winder and/or the fiber web production line that receives and processes data related thereto.

In this description and in the claims by the term "advisor unit" is meant a processor and a memory unit with and a computer code for example a software application, to provide operating instructions based on measurement results received from the fiber web production line and from the slitter-winder for controlling performance of the slitter-winder and/or a fiber web production line. Thus, the advisor unit receives, collects, processes, stores, and transmits data. The advisor unit may be configured as one entity, or it may be configured of separate units connected with each other by means of data transfer connections. The advisor unit is configured to provide control data to control the performance of the slitter-winder and/or the fiber web production line. The control data is transmitted to control the fiber web production line and/or to the slitter-winder. The control data may be transmitted to a control unit of an element and/or of a device and/or of a section of the fiber web production line and/or of the slitter-winder. The control unit may be configured to provide automatic control and/or to manual control of the slitter-winder or the fiber web production line.

In the description and in the claims by the expression "to control (and its derivates) performance of a/the slitter-winder and/or a/the fiber web production line" is meant to control the slitter-winder/at least one of the slitter-winders of the fiber web production line, to which the slitter-winder/the slitter-winders are operationally connected. Advantageously, in case the fiber web production line comprises more than one slitter-winder the performance of all the slitter-winders is controlled.

In the description and in the claims by the expression "first . . . data" and "second . . . data" is meant data received from different sources or data transmitted to different target. The expression "predetermined configuration" comprises for example self-learning systems, neural networks etc. The expression "operating model" means models of operating the slitter-winder and/or of the fiber web production line, for example models based on 1st principle such as physical models and combinations thereof, learning models, digital twin-type models etc.

According to the invention the system for controlling performance of the slitter-winder and/or the fiber web production line comprises an advisor unit comprising at least one processor and at least one memory including computer program code, the at least one memory and the computer program code are configured, with the at least one processor, to cause the advisor unit to generate and transmit signals as first control data to the slitter-winder and/or as second control data to the fiber web production line based on first information data received from the slitter-winder and based on second information data received from the fiber web production line to control the performance of the slitter-winder and/or the fiber web production line.

According to an advantageous feature of the invention the advisor unit is configured to transmit the first control data to an information sharing unit for manual control of the performance of the slitter-winder and/or the fiber web production line.

According to an advantageous feature of the invention the advisor unit is configured to transmit the second control data to a control unit for automatic control of the performance of the slitter-winder and/or the fiber web production line.

According to an advantageous feature of the invention the information data received by the advisor unit comprises first measurement data received from measurement devices of the slitter-winder and second measurement data received from the fiber web production line.

According to an advantageous feature of the invention information data received by the advisor unit comprises data from at least one operating model of the slitter-winder and/or of the fiber web production line and/or from other data sources provided in connection with the fiber web production line.

According to an advantageous feature of the invention measurement devices of the slitter-winder are configured to measure at least diameter profile and/or diameters of a set of customer rolls and/or centricity of winding cores and/or tension of the fiber web and/or the measurement devices of the fiber web production line are configured to measure at least one of the group of: moisture profile, tensile strength, bursting strength, basis weight profile and caliper profile of the fiber web.

According to an advantageous feature of the invention signals of the first and second control data comprises instructions signal data sent to the fiber web production line to adjust at least one of the group of: tension, tensile strength, bursting strength, moisture profile, basis weight profile and caliper profile of the fiber web.

According to an advantageous feature of the invention at least one of the measurement devices is a measuring roll, in which the measurement is based on the pressure-sensitive film.

According to an advantageous feature of the invention the advisor unit is provided with an AI (Artificial Intelligence)-application.

According to the invention the method of controlling performance of a slitter-winder and/or a fiber web production line comprises:

receiving first information data from slitter-winder, receiving second information data from fiber web production line, processing the received first and second information data according to predetermined configuration, based on the processed data, generating signals according to predetermined configuration to control the performance of the fiber web production line and/or the slitter-winder.

According to an advantageous feature of the invention the signals are transmitted as first control data to the slitter-winder and/or as second control data to the fiber web production line based on the first information data received from the slitter-winder and based on the second information data received from the fiber web production line to control the performance of the slitter-winder and/or the fiber production line.

According to an advantageous feature of the invention in the method the steps of receiving first information data from slitter-winder, receiving second information data from fiber web production line, processing the received information data according to predetermined configuration, based on the processed data, generating signals according to predetermined configuration to control the performance parameters of the fiber web production line and/or the slitter-winder, are performed in a system comprising an advisor unit.

According to an advantageous feature of the invention in the method the advisor unit provides the control data to adjust at least one of the running parameters of the fiber web production line to control the performance of the slitter-winder and/or the fiber web production line.

According to an advantageous feature of the invention in the method the advisor unit provides the control data to adjust at least one of the running parameters of the slitter-winder and/or the fiber web production line to control the performance of the slitter-winder and/or the fiber web production line to an information sharing unit and/or to a control unit.

According to an advantageous feature of the invention the information data received from the slitter-winder comprises measurement data from measurement devices of the slitter-winder, which measurement data comprises at least one measurement data of the group of: diameter profiles of a set of customer rolls and/or of centricity of winding cores and/or of tension of the fiber web, and/or the information data received from the fiber web production line comprises measurement data of at least one measurement data of the group of: moisture profile, tensile strength, bursting strength, basis weight profile and/or caliper profile of the fiber web.

According to an advantageous aspect of the invention it is possible to optimize the fiber web profiles in the fiber web production line, like moisture profile, tensile strength, bursting strength, basis weight profile and caliper profile, but also others, so that web tension, advantageously tension profile in cross-direction of the fiber web, profile and winder set diameter profiles are optimal for the slitter-winder. Optimum can be a set roll diameter profile and/or diameters so that rider roll keeps the contact throughout most of the customer roll build-up at the slitter-winder.

According to an advantageous aspect of the invention the advisor unit is configured to optimize running parameters of the fiber web production line to so that measured vibrations of the slitter-winder are minimized and/or that customer roll core eccentricity produced by the slitter winder is minimized.

The system and the method according to the invention may also optimize the pulp treatment, for example refining degree to control the performance the slitter-winder.

The system and the method according to the invention may also send control data to adjust winding recipes, for example to adjust load of the rider roll, fiber web tension, advantageously tension profile in cross-direction of the fiber web, and/or winding force, and/or to adjust operation of the core locks and/or to adjust acceleration and/or deceleration and/or running speed.

The system and the method according to the invention may also send control data to a spreading device of the slitter-winder to adjust the spreading of the slitted fiber webs after the slitting section before the winding section.

In the system and the method according to the invention the adjustment may also within winding a set of the customer rolls, i.e. adjustment can be performed while winding the set of the customer rolls. The adjustment can also remain as set during the time the winding of the one set of the customer rolls.

According to an advantageous aspect of the invention with the method and the system of controlling performance of a slitter-winder and/or a fiber web production line comprises receiving measurement data from measurement devices of the slitter-winder and/or information data from a model of operating the slitter-winder and from measurement devices of the fiber web production line and/or information data from a model of operating the fiber web production line and sending the received measurement and/or information data to an advisor unit, in which instructions of controlling performance of the slitter-winder and/or the fiber web production line are calculated and prepared based on the received measurement and/or model data. The advisor unit is configured to send the instructions to adjust, for example amend or keep, at least one of the running parameters of the fiber web production line to control the performance the slitter-winder and/or to adjust, for example amend or keep, at least one of the running parameters of the slitter-winder and/or the fiber web production line to control the performance of the slitter-winder and/or the fiber web production line by transmitting the control information to an information sharing unit such, as a display monitor, and/or to a control unit for automatic or manual control. The instructions can be to the information sharing unit for an operator to manually amend and/or keep at least one of the running parameters and/or to an automatic control unit for automatically to amend and/or keep at least one of the running parameters.

According to an advantageous aspect of the invention in the system and the method of controlling performance of a slitter-winder and/or a fiber web production line the model of the slitter-winder or the model of the fiber web production line can be an adaptive model updating itself in real time based on the received measurement results from the measurement devices of the slitter-winder and/or from measurement devices of the fiber web production line.

According to an advantageous aspect of the invention in the system and the method of controlling performance of a slitter-winder and/or a fiber web production line measurement, devices are configured to measure at least measure diameter profile and/or diameters of a set of customer rolls and/or centricity of winding cores to received measurement data respectively. The measurement devices configured to measure the diameter profile and/or diameters of a set of customer rolls can be located in connection with the slitter-winder or in connection with a conveyor, which is configured to receive sets of finished customer rolls from the winder of the slitter-winder.

The roll diameters can be measured, and a set roll diameter cross profile could be that way be defined. The effect of roll diameter differences could also be measured by means of measurement of nip-load profile on a rider roll, light penetration between the rider roll nip and the rolls in the set. Roll diameters can also be measured after the slitter-winder and data fed back.

According to an advantageous aspect of the invention measurement devices of the fiber web production line measure moisture profile, tensile strength, bursting strength, basis weight profile and/or caliper profile of the fiber web, as well as for example coating profile and/or refining degree of the pulp. Advantageously, in the slitter-winder web tension, advantageously tension profile in cross-direction of the fiber web, profile and/or winder set diameter profiles and/or winding core eccentricity can be measured.

According to an advantageous aspect of the invention in the system and the method of controlling performance of a slitter-winder and/or a fiber web production line at least one measurement device can be a measuring roll, in which the measurement is based on the pressure-sensitive film, i.e. it can be a measuring roll of the type known by the applicant's trade name 'iRoll'.

The measurement devices can also be various types of measurement devices, for example sensors etc., which are known as such for one skilled in the art.

According to an advantageous aspect of the invention in the system and the method of controlling performance of a slitter-winder and/or a fiber web production line the measurement data relation of the measurement data of a set of customer rolls and its transfer to the advisor unit can be performed manually on basis of information of respective reeling shaft around which the parent roll unwound for the set of the customer rolls is wound in the reel-up or by utilizing RFID-technology and providing the customer rolls of the set of the customer roll with RFID-tags for indicating the respective customer rolls in respect of the measurement data.

According to an advantageous aspect of the invention in the system and the method of controlling performance of a slitter-winder and/or a fiber web production line it is possible to transfer the respective measurement data directly on the fiber web wound to the roll e.g. by means of RFID-tags.

According to an advantageous aspect of the invention in the method and the system of controlling performance of a slitter-winder and/or a fiber web production line the advisor unit may have a feedback connection to running program of the slitter-winder, whereby it is possible to utilize data synchronization of cyclic measurements of the operation sequences of the slitter-winder for the measurements by the measurement device/-s of the slitter-winder. This is particularly advantageous in cases the performance control of the slitter-winder and/or the fiber web production line is desired for sets of the customer rolls.

According to an advantageous aspect of the invention in the system and the method of controlling performance of a slitter-winder and/or a fiber web production line the advisor unit is AI (Artificial Intelligence)-application run in a computer or like. Advantageously, by the AI-application running parameters of the fiber web production line effecting the properties of the fiber web, such as grammage, basis weight, tensile strength, bursting strength, moisture content, caliper etc. are controlled actively. Advantageously, by the AI-application running parameters of the slitter-winder effecting such as winding recipes, load of a rider roll, opening of the carrier rolls, running speed etc. are controlled actively. The advisor unit may also be based on software robotics.

According to an advantageous aspect of the invention in the system and the method of controlling performance of a slitter-winder and/or a fiber web production line the running speed of the fiber web production line is controlled in respect of parent rolls in the parent roll storage for the slitter-winder and the running program such, that the risk of web breaks in the slitter-winder are eliminated or at least minimized.

According to an advantageous aspect of the invention the controlling of the performance of the slitter-winder and/or a fiber web production line comprises a winding process performance optimization based on measurement data of the slitter-winder and data of the fiber web production line, diagnostics of the data and indexing the data such, that the winding process performance is controlled to achieve an optimized result. Thus, the data from the slitter-winder and the fiber web production line can be combined and synchronized to control the slitter-winder performance.

According to an advantageous aspect of the invention the performance of the slitter-winder and/or the fiber web production line process utilizes from the fiber web production line and from the slitter-winder received measured process data can be used for this purpose. The measurement data comprises for example measurement data of core lock eccentricity, measurement data from condition monitoring sensors and other sensors of the fiber web production line and of the slitter-winder. The customer rolls in a set are provided with RFID tags. In connection with the slitter-winder reader stations for reading the RFID tags are provided to match the slitter-winder performance and the fiber web production line performance.

According to an advantageous aspect on the basis of the cross correlations of profile information received from the fiber web production line and information of the slitter-winder process performance are created.

By the invention and its advantageous features many advantages are achieved: In the system and the method of controlling performance of the slitter-winder and/or the fiber web production line the capacity of the slitter-winder and/or the fiber web production line is increased because slitter-winder and/or the fiber web production line can be operated at higher speed, compared to situation without invention when slitter-winder was typically operated at slower speed as a precursory measure to avoid web breaks etc. stops in process. The capacity of the slitter-winder may even be increased such, that only one slitter-winder is needed to fulfil the capacity need to the fiber web production line, which in turn means significant savings in investment and operating costs of the fiber web production line. Also, it is possible to detect non optimal areas in the fiber web and run the slitter-winder in a more careful way, by for instance with reduced speed, to prevent web breaks and save in that way total through-put of the slitter-winder.

BRIEF DESCRIPTION OF THE DRAWINGS

In the following the invention is explained in detail with reference to the accompanying drawing to which the invention is not to be narrowly limited.

During the course of the following description like numbers and signs will be used to identify like elements according to the different views which illustrate the invention and its advantageous examples. In the figures some repetitive reference signs have been omitted for clarity reasons.

DESCRIPTION OF THE PREFERRED EMBODIMENTS

Figure 1:
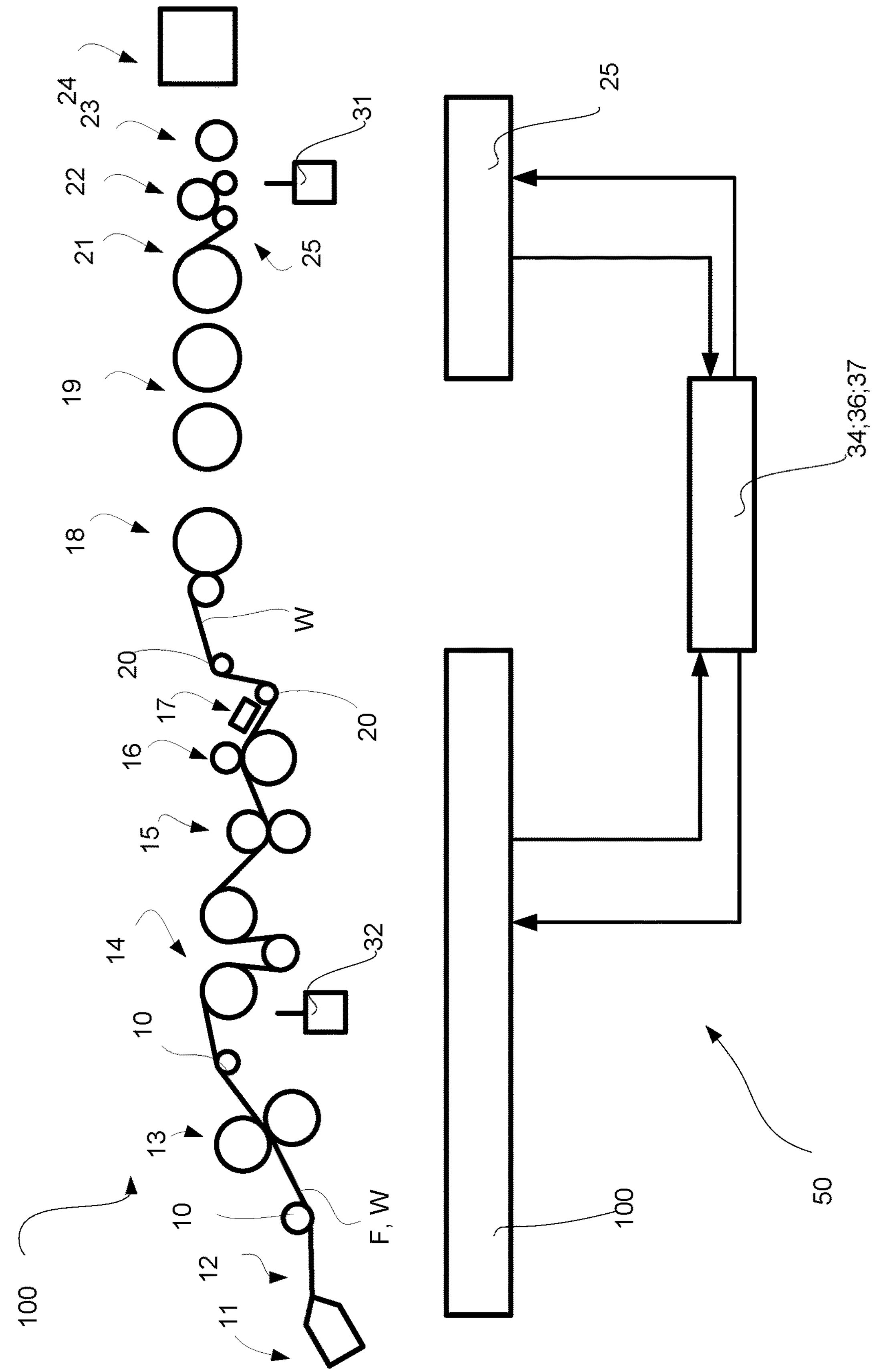
In FIG. 1 is shown schematically an advantageous example of a part of an arrangement comprising a fiber web production line and a slitter-winder and a system of controlling performance of a slitter-winder and/or the fiber web production line for carrying out an advantageous example of a method of controlling performance of a slitter-winder and/or a fiber web production line.

In FIG. 1 is very schematically shown a fiber web production line 100, which in the shown example comprises a head box 11, a forming section 12, a press section 13, a drying section 14, a calender 15, a coating section 16 with drying equipment 17, a reel-up 18 and a parent roll storage 19. In the figure is also shown very schematically a slitter-winder 25 comprising an unwinding station 21 of a slitter-winder 25, a slitting section (not shown) of the slitter-winder 25, a winding section with a winder 22 of the slitter-winder 25. The slitter-winder is followed by a customer roll storage 23, as well as a packaging section 24. In the fiber web production line 100 there are also guide rolls 10, 20 for guiding and supporting the fiber web W and/or the fabric F supporting the web W. The fiber web W is typically supported by fabrics during forming, pressing and drying. The fiber web production line 100 may also comprise other elements, devices and sections known as such to one skilled in the art. For example, the fiber web production line may comprise an off-line coating section. Also, the fiber web production line 100 may comprise a pulp treatment section for treatment of pulp and/or re-cycled fibers for supplying pulp to the head box 11.

The system 50 of the fiber web production line 100 for controlling performance of the slitter-winder 25 and/or the fiber web production line 100 comprises receiving measurement data from measurement devices 31 of the slitter-winder 25 and/or information data from a model of operating the slitter-winder 25 and from measurement devices 32 of the fiber web production line 100 and/or information data from a model of operating the fiber web production line 100. The received measurement and/or information data is transmitted to an advisor unit 34 via a data connection, combination and processing unit 37 thereof or via a connection from data connection, combination and processing unit 37. The advisor unit 34 may also receive data from other data sources 36 or via a connection from other data sources 36, in which advisor unit 34 instructions of controlling performance of the slitter-winder 25 and/or a fiber web production line 100 are calculated and prepared based on the data received as measurement results and/or from a model. The advisor unit 34 is configured to send the instructions to adjust least one of the running parameters of the fiber web production line 100 to control the performance of the slitter-winder 25 and/or the fiber web production line 100 and/or to adjust at least one of the running parameters of the slitter-winder 25 to control the performance of the slitter-winder 25 and/or the fiber web production line 100. The instructions are sent to an information sharing unit such as, a display monitor unit, for an operator to manually adjust at least one of the running parameters and/or to a control unit for automatically to adjust at least one of the running parameters. In the fiber web production line 100 with the method and the system of controlling performance of the slitter-winder 25 and/or the fiber web production line 100 the measurement devices 31 are configured to measure at least diameter profile and/or diameters of a set of customer rolls and/or centricity of winding cores. The measurement devices configured to measure the diameter profile and/or diameters of a set of customer rolls can be located in connection with the slitter-winder or in connection with a conveyor, which is configured to receive sets of finished customer rolls from the winder 22 of the slitter-winder 25.

Figure 2:
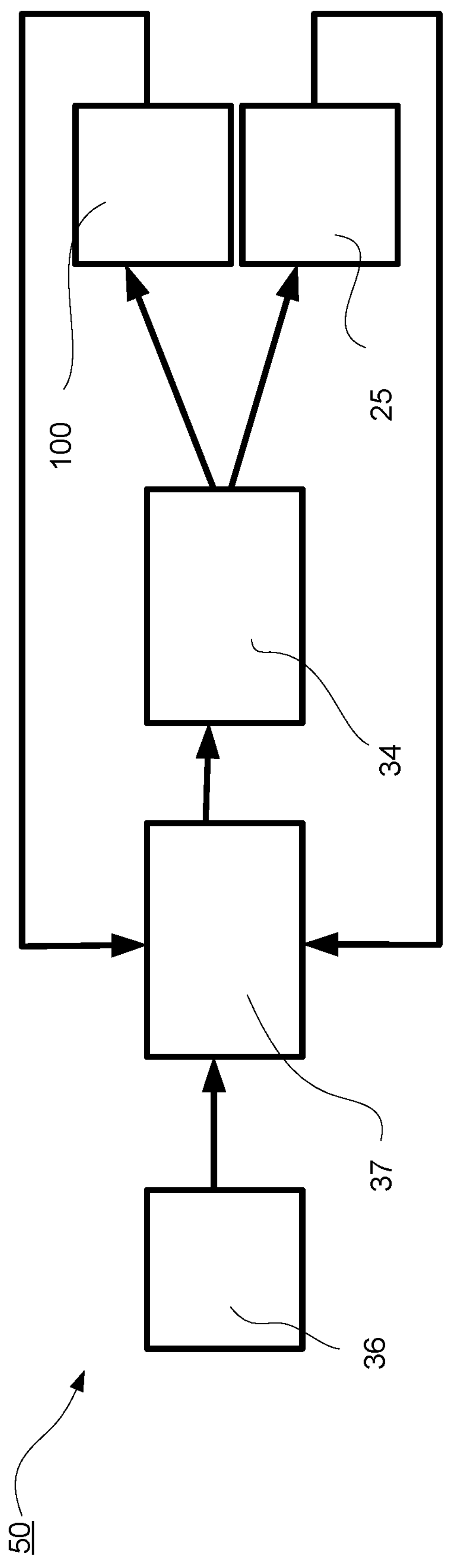
In FIG. 2 is shown a schematical example as a basic flowchart illustrating stages of an advantageous example of a system of controlling performance of a slitter-winder and/or a fiber web production line.

In FIG. 2 is shown a schematical example as a basic flowchart illustrating stages of a system 50 of controlling performance of a slitter-winder 25 and/or a fiber web production line 100. The system 50 comprises a data connection, combination and processing unit 37, which receives data from data sources of the fiber web production line 100 and from the slitter-winder 25 as well as from other data sources 36, for example from laboratory, analyzers and manufacturing execution system. The data comprises measurement results from measuring devices, signals from systems and sample taking stations. In the data connection, combination and processing unit 37 processed data is transmitted to an advisor unit 34, in which the data is optimized for the slitter-winder performance and/or the fiber web production line performance and the fiber web production line 100 and the slitter-winder 25 and/or the fiber web production line 100 receives the optimized data for controlling the performance of the slitter-winder 25 and/or the fiber web production line.

The advisor unit 34 may also be configured to optimize running parameters of the fiber web production line 100 to so that measured vibrations of the slitter-winder 25 are minimized and/or that customer roll core eccentricity produced by the slitter winder 25 is minimized.

In the description in the foregoing, although some functions have been described with reference to certain features and examples, those functions may be performable by other features and examples whether described or not. Although features have been described with reference to the certain examples, those features may also be present in other examples whether described or not.

Above only some advantageous examples of the inventions have been described to which examples the invention is not to be narrowly limited and many modifications and alterations are possible within the invention.

We claim:

1. A system for controlling performance of a slitter-winder and a fiber web production line, the system comprising:

an advisor unit comprising at least one processor and at least one memory unit including computer program code;

wherein the at least one memory unit and the computer program code are configured, with the at least one processor, to cause the advisor unit to generate and transmit signals comprising first control data to the slitter-winder and second control data to the fiber web production line based on first information data received from the slitter-winder and based on second information data received from the fiber web production line to control the performance of the slitter-winder and the fiber web production line; and wherein the advisor unit is configured to optimize running parameters of the fiber web production line and vibrations in the slitter-winder, and under the control of the advisor unit, the vibrations of the slitter-winder are minimized by adjustments to the fiber web production line and the slitter-winder.

2. The system of claim 1 wherein the advisor unit is configured to transmit the first control data to an information sharing unit for manual control of the performance of at least one of the slitter-winder and the fiber web production line.

3. The system of claim 1 wherein the advisor unit is configured to transmit the second control data to a control unit for automatic control of the performance of at least one of the slitter-winder and the fiber web production line.

4. The system of claim 1 wherein the information data received by the advisor unit comprises first measurement data received from measurement devices of the slitter-winder and second measurement data received from measurement devices of the fiber web production line.

5. The system of claim 4 wherein in the measurement devices of the slitter-winder are configured to measure at least one of diameter profile, diameters of a set of customer rolls, centricity of winding cores, and tension of the fiber web.

6. The system of claim 5 wherein the measurement devices of the fiber web production line are configured to measure at least one of moisture profile, tensile strength, bursting strength, basis weight profile and caliper profile of the fiber web.

7. The system of claim 4 wherein the measurement devices of the fiber web production line are configured to measure at least one of moisture profile, tensile strength, bursting strength, basis weight profile and caliper profile of the fiber web.

8. The system of claim 1 wherein signals of the first and second control data comprise instructions signal data sent to the fiber web production line to adjust at least one of the group of: tension, tensile strength, bursting strength, moisture profile, basis weight profile and caliper profile of the fiber web.

9. The system of claim 1 wherein at least one of the measurement devices is a measuring roll, in which the measurement is based on a pressure-sensitive film.

10. The system of claim 1 further comprising:

measurement devices of the slitter-winder configured to measure at least one of diameter profile, diameters of a set of customer rolls, centricity of winding cores, and tension of the fiber web, wherein the measurements comprise the first information data; and measurement devices of the fiber web production line configured to measure at least one of moisture profile, tensile strength, bursting strength, basis weight profile and caliper profile of the fiber web, wherein the measurements comprise the second information data.

11. The system of claim 1 wherein the advisor unit is configured to adjust running parameters of the slitter-winder while winding a set of customer rolls.

12. A system for controlling performance of a slitter-winder and a fiber web production line, the system comprising:

an advisor unit comprising at least one processor and at least one memory unit including computer program code;

wherein the at least one memory unit and the computer program code are configured, with the at least one processor, to cause the advisor unit to generate and transmit signals comprising first control data to the slitter-winder and second control data to the fiber web production line based on first information data received from the slitter-winder and second information data received from the fiber web production line to control the performance of the slitter-winder and the fiber web production line, wherein information data received by the advisor unit comprises data from the group consisting of an operating model of the slitter-winder and an operating model of the fiber web production line based on first principles physical models; self-learning systems; neural networks; learning models; artificial intelligence; and digital twin-type models.

13. The system of claim 12 further comprising:

measurement devices of the slitter-winder configured to measure at least one of diameter profile, diameters of a set of customer rolls, centricity of winding cores, and tension of the fiber web, wherein the measurements comprise the first information data; and measurement devices of the fiber web production line configured to measure at least one of moisture profile, tensile strength, bursting strength, basis weight profile and caliper profile of the fiber web wherein the measurements comprise the second information data.

14. The system of claim 12 wherein the advisor unit is configured to actively control running parameters of the fiber web production line effecting the properties of the fiber web including grammage, basis weight, tensile strength, bursting strength, moisture content, and caliper and to actively control running parameters of the slitter-winder including winding recipes, load of a rider roll, opening of carrier rolls, and running speed.

15. A system for controlling performance of a slitter winder and a fiber web production line, the system comprising:

an advisor unit comprising at least one processor and at least one memory unit including computer program code;

wherein the at least one memory unit and the computer program code are configured, with the at least one processor, to cause the advisor unit to generate and transmit signals comprising first control data to the slitter-winder and second control data to the fiber web production line based on first information data received from the slitter-winder and second information data received from the fiber web production line to control the performance of the slitter-winder and the fiber web production line; and wherein the advisor is configured to optimize the fiber web production profiles in the fiber web production line so a web tension in a cross-direction and winder set diameter profiles are optimal for the slitter-winder, wherein optimal is the roll diameters of the customer rolls of a set of customer rolls being wound is such that a rider roll in the slitter-winder keeps contact with the customer rolls of the set throughout most of building up of the customer rolls of the set.

16. The system of claim 15 further comprising:

measurement devices of the slitter-winder configured to measure at least one of diameter profile, diameters of a set of customer rolls, centricity of winding cores, and tension of the fiber web, wherein the measurements comprise the first information data; and measurement devices of the fiber web production line configured to measure at least one of moisture profile, tensile strength, bursting strength, basis weight profile and caliper profile of the fiber web wherein the measurements comprise the second information data.

* * * * *